(12) United States Patent
Ivory

(10) Patent No.: US 6,771,745 B2
(45) Date of Patent: Aug. 3, 2004

(54) METHOD AND APPARATUS FOR TELEPHONE DIALLING USING A NETWORK DEVICE

(75) Inventor: William James Ivory, Edinburgh (GB)

(73) Assignee: 3Com Corporation, Santa Clara, CA (US)

( * ) Notice: Subject to any disclaimer, the term of this patent is extended or adjusted under 35 U.S.C. 154(b) by 302 days.

(21) Appl. No.: 09/862,351

(22) Filed: May 22, 2001

(65) Prior Publication Data

US 2002/0141550 A1 Oct. 3, 2002

(30) Foreign Application Priority Data

Mar. 28, 2001 (GB) .............................................. 0107821

(51) Int. Cl.[7] .............................................. H04M 1/00
(52) U.S. Cl. .............................. 379/88.13; 379/88.14; 379/88.17; 379/88.22
(58) Field of Search .......................... 379/67.1, 77, 84, 379/87, 88.12, 88.13, 88.14, 88.16, 88.19, 88.2, 88.21, 88.22–88.28, 88.17; 709/200, 201, 212, 217, 227

(56) References Cited

U.S. PATENT DOCUMENTS 6,466,654 B1 * 10/2002 Cooper et al. ........... 379/88.01

2002/0128036 A1 * 9/2002 Yach et al. .................. 455/552
2002/0131566 A1 * 9/2002 Stark et al. ............... 379/88.19
2002/0181398 A1 * 12/2002 Szlam ........................ 370/352

FOREIGN PATENT DOCUMENTS

| EP | 0 876 043 A2 | 11/1998 |
| EP | 0 957 621 A2 | 11/1999 |
| WO | WO 98/48549 | 10/1998 |

* cited by examiner

Primary Examiner—Fan Tsang
Assistant Examiner—Ovidio Escalante
(74) Attorney, Agent, or Firm—Michaelson & Associates; Peter L. Michaelson; Janet M. Skafar

(57) ABSTRACT

A voicemail processing system and method for use in a communications system for returning a telephone call in response to a voicemail message is disclosed. The processing system comprises a processor for receiving caller identifying information relating to a voicemail message. The processor is configured to use the received caller identifying information to generate a file or script containing the caller identifying information for inclusion in an email, for example as an attachment. The email is preferably sent to a network device upon user request, so that the user can use the email attachment in conjunction with a software application running on the network device to automatically initiate the return of the telephone call using an associated telephone device. In a preferred embodiment, the software application is a Telephony Application Program Interface (TAPI) application.

15 Claims, 3 Drawing Sheets

METHOD AND APPARATUS FOR TELEPHONE DIALLING USING A NETWORK DEVICE

BACKGROUND OF THE INVENTION

1. Field of the Invention

The present invention relates generally to telephone communications systems and more particularly to telephone systems adapted to provide voicemail to a device, for example a personal computer, on a data communications network.

2. Description of the Related Art

Many telephone systems have voicemail capabilities, accessible telephone devices. Such systems can offer advanced features, even allowing the recipient to call back the original caller without the recipient needing to dial the full number using his or her telephone. Instead, the voicemail system typically handles the dialling automatically.

Some telephone systems provide the facility to forward a voicemail message as an attachment to an email message. This enables the recipient to access the voicemail on their computer. An example of such a system is the 3Com SuperStack 3 NBX® Networked Telephony Solution (formerly the NBX® 25/100 communications system) available from 3Com Corporation of Santa Clara, USA. This system provides access to the voicemail message through email software compatible with the industry standard Internet Message Access Protocol (IMAP) for accessing email from a local server. Upon user request, the system downloads any voicemail messages to a relevant email client (e.g. personal computer), by constructing an email from a template and attaching the voicemail as a ".WAV" file. The email is received by the personal computer of the user by standard IMAP procedures.

However, such systems do not provide an easy way to return the original call. In particular, whilst the number of the original caller may be printed as text in the email, in order to return the call, the recipient must manually dial this number, either on his or her phone, or using a Telephony Application Program Interface (TAPI) application on the computer. This can lead to errors due to misdialling of the printed number.

The present invention seeks to address this problem.

SUMMARY OF THE INVENTION

In accordance with a first aspect, the present invention provides a method for returning a telephone call in response to a voicemail message received by a communications system, the method comprising: receiving caller identifying information relating to a voicemail message, and generating a file or script containing the caller identifying information for inclusion in an email, whereby a network device receiving the email can use the caller identifying information in conjunction with a software application to automatically initiate the return of the telephone call.

Preferably, the file generated is of a type compatible with a Telephony Application Program Interface (TAPI) or similar software application.

The present invention thus provides a much simpler and error-free way to return a telephone call; in comparison with prior art techniques.

In a preferred embodiment, the method is performed in response to a user requesting the voicemail message to be provided by email using a network device on the communications system. The email is then sent to the network device with the attachment, and, using the attachment, the user is able to initiate the return of the call using the network device and an associated telephone device.

In accordance with a second aspect, the present invention provides a computer program for carrying out a method in accordance with the first aspect of the present invention.

In accordance with a third aspect, the present invention provides a voicemail processing system, for use in a communications system, for returning a telephone call in response to a voicemail message received by the processing system, the processing system comprising: a processor for receiving caller identifying information relating to a voicemail message, the processor generating a file or script containing the caller identifying information for inclusion in an email, whereby a network device receiving the email can use caller identifying information in conjunction with a software application to automatically initiate the return of the telephone call.

Preferably the processing system further comprises memory, associated with the processor, for storing voicemail messages and caller identifying information for retrieval in response to a request from a system user.

Other preferred and optional features of the present invention will be apparent from the following description and accompanying claims.

BRIEF DESCRIPTION OF THE DRAWINGS

Embodiments of the present invention will now be described, by way of example, with reference to the accompanying drawings, in which.

DESCRIPTION OF THE PREFERRED EMBODIMENTS

Figure 1:
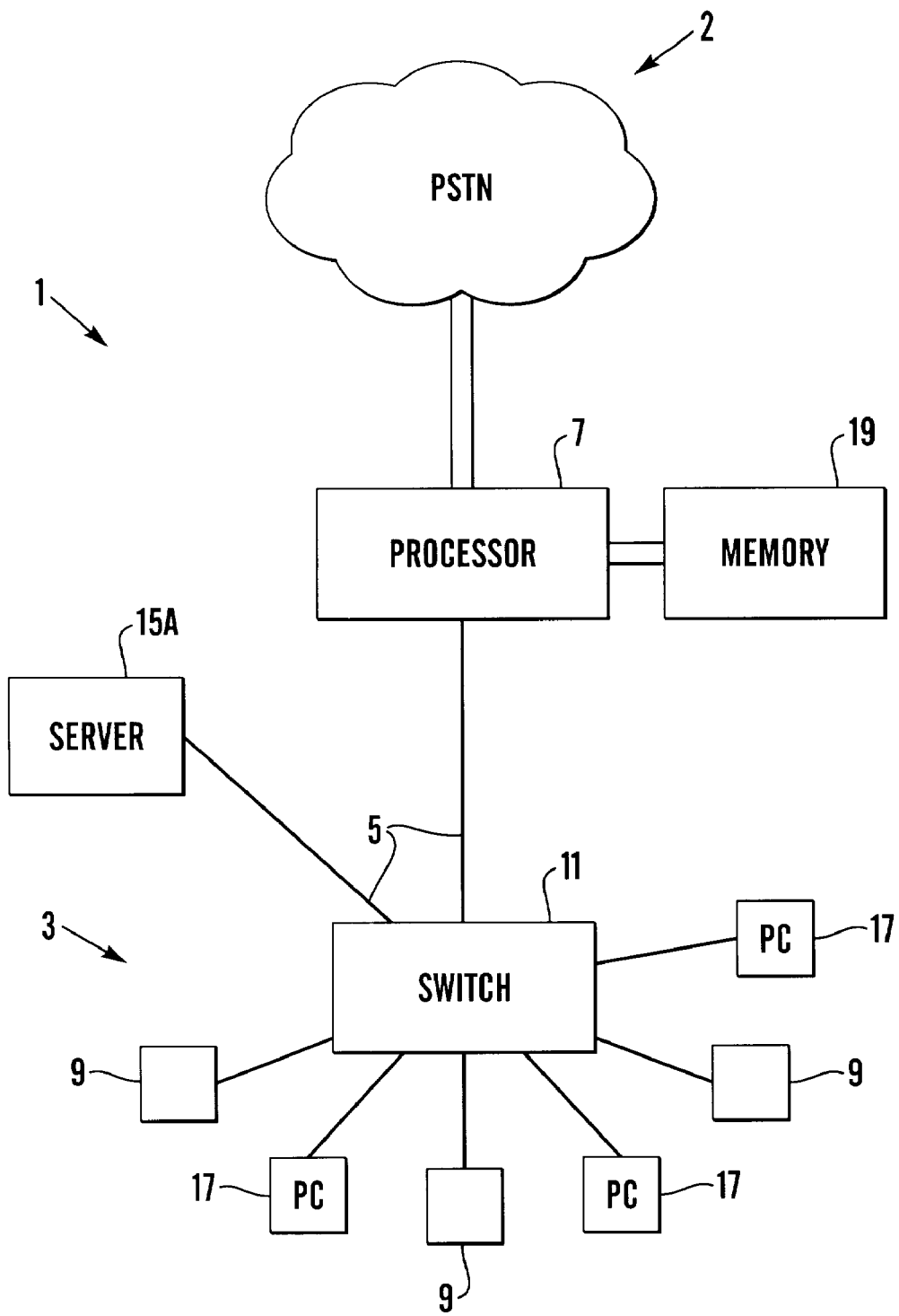
FIG. 1 is a simplified block diagram of a communications system which may be used in accordance with the present invention.

FIG. 1 illustrates a communications system 1 which may be used in accordance with the present invention. In a preferred embodiment, the aforementioned system of 3Com Corporation is employed. However, the skilled person will appreciate that systems of other vendors may be used.

The system 1 of the preferred embodiment is a Local Area Network (LAN) based system utilising infrastructure of a LAN 3 (i.e. for non-wireless LANs, media links 5 comprising coaxial cable, twisted pair cable or fibre optic cable) and connects to one or more lines on the Public Switched Telephone Network (PSTN) 2.

The system 1 comprises a call processor 7 connected to the LAN 3 and the PSTN 2. The LAN 3 includes a plurality of LAN-based telephone devices 9, preferably NBX® business telephones available from 3Com Corporation. In addition, LAN 3 includes LAN core network devices 11, such as switches, hubs and routers, server devices, including file server 15A and Personal Computers (PCs) 17.

When a telephone call is made to a telephone device 9, whether from another telephone device on the network or from a telephone external to LAN 3 over PSTN 2, the call signalling passes through call processor 7, which essentially is responsible for allowing calls to be made from and to the network, as is well known in the art. If the telephone device is engaged or is not answered within a predetermined number of rings, the voicemail function is activated and the caller is able to leave a voice message, which is stored by the call processor 7 on associated memory 19, typically on disk.

In addition to storing the voice data, the call processor 7 stores data containing the telephone number of the telephone device from which the call originated i.e. the "Caller ID" or "Calling party number". "Caller ID" and "Calling party number" are the names of services provided by telephone service providers, the latter for ISDN services. However, the skilled person will appreciate that the present invention is not limited to the use of these specific services. On the contrary, the present invention may utilise any appropriate manner of obtaining caller identifying information in any suitable form.

When a user wishes to retrieve his or her voicemail messages, this may be achieved using a telephone device 9. The telephone device 9 may be operated to retrieve the voicemail messages from the memory 19 associated with the call processor 7. In addition, the caller identifying information may be used to enable the call to be returned using the telephone device 9.

Alternatively, the user may retrieve voicemail messages from the call processor using his or her PC 17. In this case, the PC 17 may be operated to retrieve the voicemail messages in the form of a ".wav" attachment to an email. The call processor 7, upon receipt of the request from the PC 17, will generate an email text message, using a conventional template, and an attachment containing the voicemail message, retrieved from memory 19, and forward this to the PC 17. The text of the email may include the telephone number of the caller who left the voicemail message, which can be retrieved from memory 19 by the call processor when generating the email.

In accordance with the present invention, the user is able to return the call without the need to dial the number displayed in text in such an email message.

Figure 2:
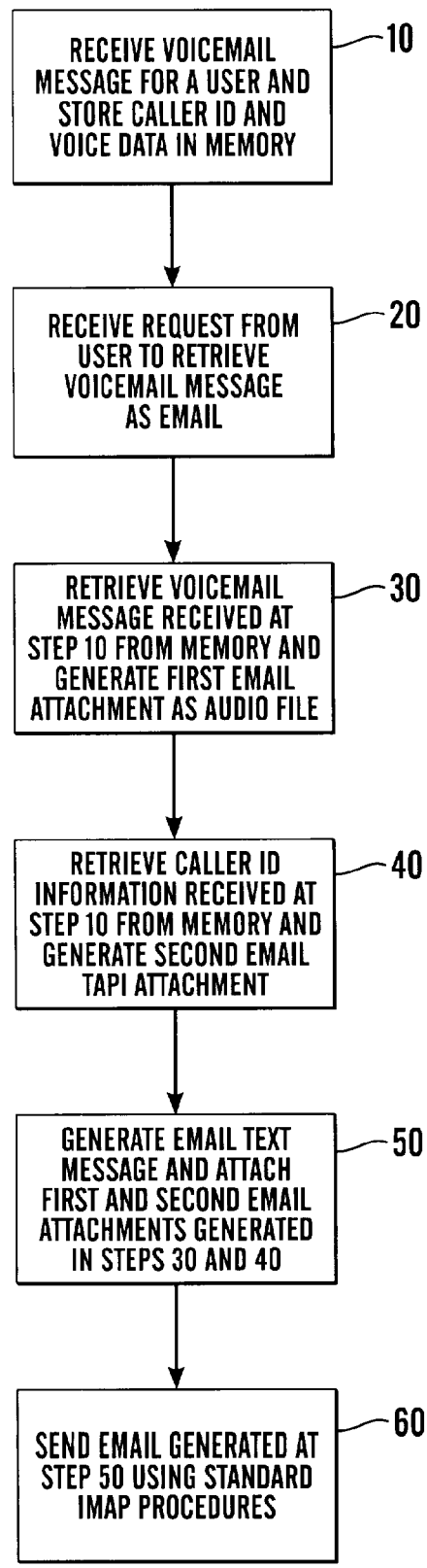
FIG. 2 is a flow diagram illustrating the process steps performed in a first stage of a method in accordance with a preferred embodiment of the present invention.

FIG. 2 shows a flow diagram of the method steps implemented in a computer program in accordance with a first processing stage of the preferred embodiment of the present invention. It will be appreciated that the method may be implemented in other forms such as hardware.

In the preferred embodiment, the program illustrated in FIG. 2 is run on the call processor 7 of the telephone communications system 1 illustrated in FIG. 1, and utilises "Caller ID" information provided by a telephone service provider as the caller identifying information.

At step 10, the program receives a voicemail message for a user and stores the voice data and Caller ID information, if available, in memory 19.

At step 20, the program receives a request from the user to retrieve the voicemail message as an email. The user will typically use a network device such as a PC 17 to send this request.

At step 30, and in response to the request received at step 20, the program retrieves the voicemail message for the user, received at step 10, from memory and generates a first email attachment as an audio file. The audio file may take any suitable form, for example it may be a ".wav" file.

At step 40, the program retrieves the Caller ID information associated with the voicemail message from memory and generates a second email attachment. The second email attachment is of a file type suitable for use with a software application for use in returning the call. For example, in the preferred embodiment, the file type is suitable for use with a TAPI-enabled software application. The second attachment contains the caller's telephone number.

At step 50, the program generates an email text message, using a template, for the user, and attaches the first attachment generated at step 30 and the second attachment generated at step 40 thereto.

At step 60, the program sends the email with the attachments to the network device used by the user using standard IMAP procedures.

It will be appreciated that program steps 30, 40 and 50 illustrated in FIG. 2 may be performed in any other suitable order.

Thus, the steps of FIG. 2 provide the user with an email attachment which can be used to automatically dial the caller's number from the network device receiving the email, as described below, with reference to FIG. 3.

Figure 3:
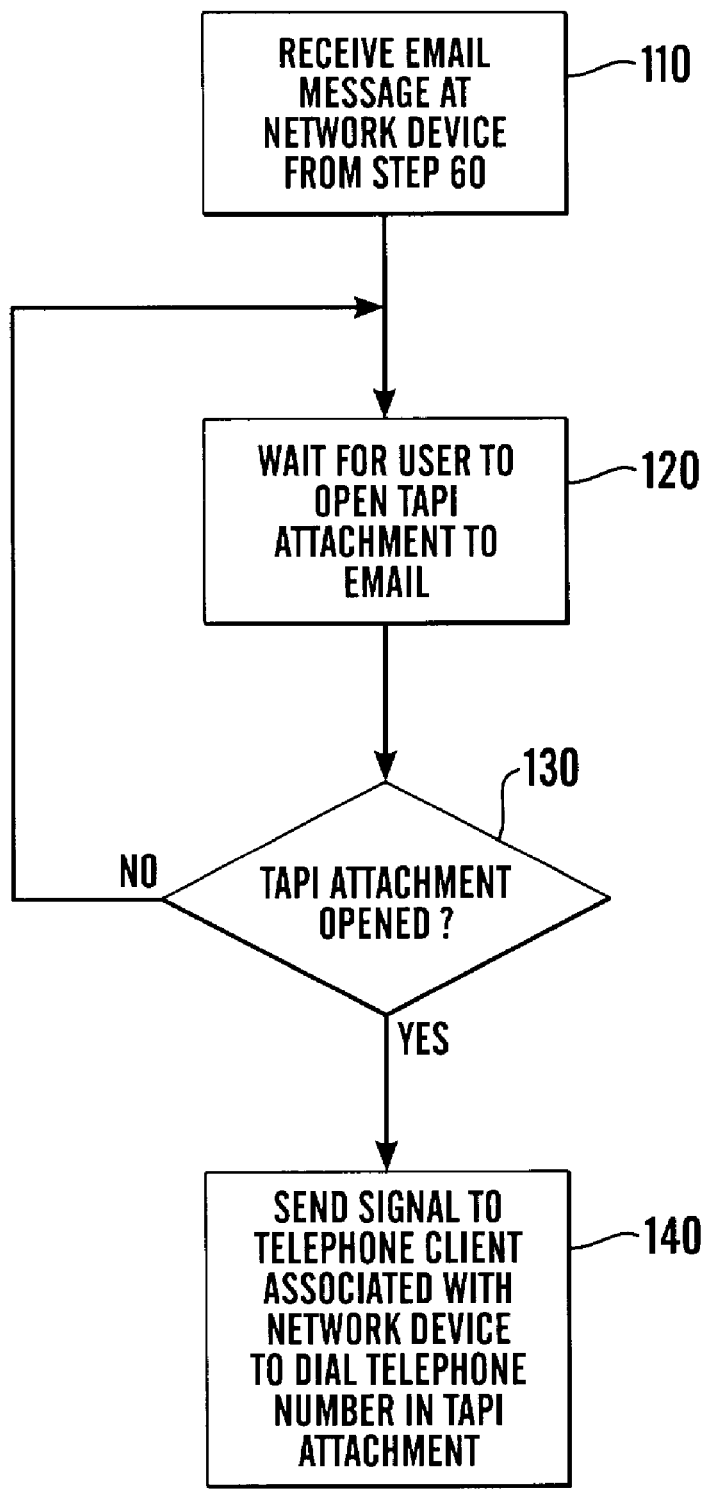
FIG. 3 is a flow diagram illustrating the process steps performed in a second stage of a method in accordance with a preferred embodiment of the present invention.

FIG. 3 shows a flow diagram of the method steps implemented in a computer program in accordance with a second processing stage of the preferred embodiment of the present invention. It will be appreciated that these steps may equally be implemented in hardware.

In the preferred embodiment, the program illustrated in FIG. 3 is run on the network device of the user. The network device may be a PC 17, a laptop or any other processing device capable of both receiving email and initiating a telephone call. Typically the network device is a combined email and TAPI client. For the purposes of the following description, it is assumed that the user retrieves email through a PC 17.

The PC 17 of the user may be configured to be associated with a particular telephone device 9, which in the present embodiment should be compliant with the ITU-T H323 standard, as a TAPI client, so that when the user retrieves voicemail messages using the PC 17, the call is returned using the most appropriate telephone device 9 (i.e. a telephone located in the immediate proximity of the PC 17 and therefore the user). In addition, the user should ensure that this telephone client is associated with the file type of the second email attachment, sent with the email at step 60 of FIG. 2, which contains the dialled number. Other manners of configuration are possible.

At step 110, the program receives the email with attachments from step 60 of FIG. 2 at the PC 17.

At step 120, the program waits for the user to open the second, TAPI attachment.

At step 130, if the second, TAPI attachment is opened, for example by the user clicking on the attachment using a mouse associated with PC 17, the program continues with step 140. Otherwise, the program returns to step 120.

At step 140, the program runs a TAPI application which sends a signal to the telephone device which is the client associated with PC 17 for the TAPI application, to dial the telephone number contained in the second email attachment. As the skilled person will appreciate, any appropriate TAPI application may be used, for example, "phone dialler" of Microsoft Corporation.

The user can then pick up the receiver of the telephone to make the call, in the usual manner, without the need to manually dial the number. Thus, problems with misdialling are avoided.

As the skilled person will appreciate, many variations and modifications may be made to the described embodiment.

For example, whilst the described implementation utilises a TAPI software application to return a call, other types of software application may be used. The call processor will generate the email attachment, containing the caller identifying information, according to the type of software application the particular user wishes to employ for returning the call.

In addition, as mentioned above, the email attachment may take any suitable form. For example, as an alternative to a TAPI attachment, it may comprise a Visual Basic Script (VBS). In particular, the email may include a VBS which sends a TAPI command directly to an active TAPI client on the network device receiving the email, together with the telephone number for dialling. The VBS is preferably included as an attachment to an email but may alternatively be embedded in the body of an email.

What is claimed is:

1. A method for enabling a telephone call to be returned in response to a voicemail message received by a communications system, the method comprising:

receiving data relating to the voicemail message, the data including caller identifying information, and generating an email including audio data containing the voicemail message, and an executable file or script containing instructions executable by a software application and including the caller identifying information, wherein a network device receiving the email can use the executable file or script with the caller identifying information in conjunction with said software application running thereon to automatically initiate the return of the telephone call.

2. A method as claimed in claim 1, wherein the step of receiving comprises retrieving the data from memory.

3. A method as claimed in claim 1, wherein the file or script containing the caller identifying information is included in the email as an attachment.

4. A method as claimed in claim 3, wherein the generated attachment is of a type suitable for use with a Telephony Application Program Interface (TAPI) software application.

5. A method as claimed in claim 1, wherein the method is performed in response to receiving a request from a user.

6. A method as claimed in claim 5, wherein the request from a user is received from a network device on the communications system.

7. A method as claimed in claim 6, further comprising sending the email to said network device.

8. A method as claimed in claim 7, further comprising, receiving the email at the network device, and running a software application to return the call, in response to a user command.

9. A method as claimed in claim 8, wherein the software application is associated with a predetermined telephone device, and running the software application causes the call to be returned using the predetermined telephone device.

10. A method as claimed in claim 9, wherein the predetermined telephone device is located in proximity to the network device.

11. A computer readable medium including a computer program for carrying out the method as defined in claim 1.

12. A method as claimed in claim 1, wherein the audio data is included in the email as a wave file (.wav) attachment.

13. A computer readable medium including a computer program for use in returning a telephone call in response to a voicemail message received by a communications system, the program comprising:

a program step for receiving data relating to the voicemail message, the data including caller identifying information, and a program step for generating an email including audio data containing the voicemail message, and an executable file or a script containing instructions executable by a software application and including the caller identifying information, wherein a network device receiving the email can use the executable file or script with the caller identifying information in conjunction with said software application running thereon to automatically initiate the return of the telephone call.

14. A voicemail processing system, for use in a communications system, for enabling a telephone call to be returned in response to a voicemail message received by the processing system, the processing system comprising: a processor for receiving data relating to the voicemail message, the data including caller identifying information, the processor generating an email including audio data containing the voicemail message, and an executable file or script containing instructions executable by a software application and including the caller identifying information, wherein a network device receiving the email can use the executable file or script with the caller identifying information in conjunction with said software application running thereon to automatically initiate the return of the telephone call.

15. A processing system as claimed in claim 14, further comprising memory, associated with the processor, for storing voicemail messages and caller identifying information for retrieval in response to a request from a system user.

* * * * *